G. E. GOWDY.
MACHINE FOR DIVIDING PLASTIC MATERIAL.
APPLICATION FILED MAR. 23, 1908.

938,050.

Patented Oct. 26, 1909.
5 SHEETS—SHEET 1.

Fig. 1.

Witnesses:
H. E. Anderson
J. E. N. Blodgett.

Inventor:
Geo. E. Gowdy
By his Attorney,
Wm. H. Blodgett.

G. E. GOWDY.
MACHINE FOR DIVIDING PLASTIC MATERIAL.
APPLICATION FILED MAR. 23, 1908.

938,050.

Patented Oct. 26, 1909.
5 SHEETS—SHEET 4.

Witnesses:
F. E. Anderson
F. E. Blodgett

Inventor:
Geo. E. Gowdy
By his Attorney,
Wm. H. Blodgett

UNITED STATES PATENT OFFICE.

GEORGE E. GOWDY, OF BELLEVILLE, NEW JERSEY.

MACHINE FOR DIVIDING PLASTIC MATERIAL.

938,050.  Specification of Letters Patent.  Patented Oct. 26, 1909.

Application filed March 23, 1908. Serial No. 422,611.

*To all whom it may concern:*

Be it known that I, GEORGE E. GOWDY, a citizen of the United States, residing at Belleville, in the county of Essex and State of New Jersey, have invented certain new and useful Improvements in Machines for Dividing Plastic Material, of which the following is a specification.

This invention relates to machines for forming plastic-material, for instance, dough, into a rod, and to cut off and gaging devices for severing predetermined lengths of said rod into cylinders or batches, each of the same weight, and ready for subsequent treatment in molding-machines or other apparatus.

Primarily the object of the invention is the provision of a machine of simple construction and reliable in operation for producing measured charges of plastic-material as will be hereinafter explained.

Other objects of the invention relate to details of construction, to improved clutching and actuating devices, and to various co-acting elements all of which will be fully set forth in the detailed description.

In the accompanying drawings.

Like numerals designate similar parts throughout the several views.

Referring to the drawings, the numeral 1 designates a machine-bed, and 2 and 3 supports for a chute 4 provided with openings to permit the entrance of feed-rolls hereinafter described. Above this chute is mounted a hopper 5 in which the material is placed, and depending from the chute is a bearing 6, which supports one end of a stationary shaft 7,—the other end of said shaft being journaled in a bearing 8 of standard 9 of the frame. Loosely mounted on the shaft 7 is a cylinder 10 provided with a series of chambers 12 within which are fitted pistons 13. Integral with or suitably connected to said pistons are rods 14 which pass through perforations 15 in a head 16 which is keyed to the hub 17 of the cylinder 10. Flanged heads 18 are secured to reduced ends 19 of rods 14, said heads being partially cut away at 18′ for a purpose hereinafter described. Rotation of pistons 13 and rods 14 is prevented by screws 20 the reduced ends 21 of which enter grooves 22 formed in said rods 14.

On the outer portion of the periphery of the head 16 is loosely mounted a ring 24 which is held thereon by a plate 25 secured by screws 26. A pawl-and-ratchet connection 27 is provided between said ring 24 and the head 16, and a curved pitman 28 is pivoted at one extremity between ears 29 rising from the periphery of ring 24 and at its other extremity to an arm 30 which is secured to a cam 31 loosely mounted on a shaft 32 journaled in bearings 33 and 34 of the machine-bed 1. In a recessed portion 35 of the cam 31 is a ratchet-wheel 36 keyed to shaft 32 and adapted to be engaged by an arm 37 of a pawl 38 which is pivoted at 39 in a slot 40 formed in the wall of recess 35. Normally the arm 37 of pawl 38 is held out of engagement with ratchet-wheel 36 against the pressure of a spring 37′ by a latch 41, pivoted at 42 and adapted to engage a shoulder 43′ of another arm 43 of said pawl 38.

On the end of shaft 32 opposite cam 31 is keyed a pulley 44 to which power may be applied by the usual belting to drive the machine. Adjacent the pulley 44 is a sprocket-wheel 45 connected by a chain 46 to another sprocket wheel 47 keyed to a shaft 48 journaled in bearings 49 and 50, which are secured to base 51 of chute 4. Keyed to shaft 48 adjacent the bearing 50 is a worm 52 in mesh with a worm-wheel 52′ secured to a shaft 53 journaled in bearings 54 and 55 of the chute 4. Keyed to shaft 53 adjacent worm-wheel 52′ is a gear 54′ in mesh with a gear 55 keyed to a shaft 56 journaled in bearings 57 depending from the base 51 of chute 4. Keyed to shaft 56 adjacent gear 55 is a sprocket-wheel 58 connected by a chain 58′ to another sprocket-wheel 59 rigid with a shaft 60 journaled in bearings of the chute 4. Mounted on the shafts 53, 56 and 60 and passing within the chute 4 are rolls 62, 64 and 63, respectively, which are rotated in the directions indicated by arrows by the gearing above described. Constituting the outer wall of chute 4 between the rolls 63 and 64 is a curved plate 65 adjustably secured by bolts 66 and 67 so that a comparatively tight joint may be obtained between said rollers and plate. At the inner end of said chute 4 is a circular opening 68 which exactly registers with any of the chambers 12, as cylinder 10 is intermittingly rotated about the shaft 7.

Secured to standard 9 is a bracket 69 having a split-bearing 70 and a plain bearing 71. Threaded into the split-bearing, which is provided with a clamp-screw 72, is a bushing 73 having a knurled head 74, and mounted in the bores in bushing 73 and bearing 71 is a screw 75 provided at its inner end with a head 76, and at its outer end with a hand-wheel 77. Between the knurled head 74 of bushing 73 and the bearing 71 a split-collar 78 is threaded upon the screw 75, and it is forced against bearing 71 by a spring 79 surrounding said screw,—the tension of spring 79 being varied as desired by adjusting the bushing 73 against the head 74 of which said spring acts. Split collar 78 is provided with a clamp-screw 80, and projecting from its under side is an arm 81 carrying a screw 82 adapted to make contact with a similar screw 83 insulated from the machine-frame and connected by a wire 84 to one pole of a battery 86. A wire 85 connected to the other pole of said battery leads to an electro-magnet 87 carried on a bracket 88 secured to the machine-bed.

Magnet 87 has a connection with the machine-frame, so that when the screws 82 and 83 come in contact with each other a circuit will be established and the magnet energized. Mounted on a short shaft 89 journaled in bearings 90 and 91 of a bracket 92 secured to the under side of the machine-bed 1 is a lever 93 having a stud 94 secured in its free end. On one side of lever 93 stud 94 is provided with a roller 95 adapted to enter a groove 96 in cam 31. On the other side of said lever one end of a link 97 is pivoted on stud 94, and the other end of said link is pivoted to an arm 98 mounted on a stud 99 which is secured in a lug 100 rising from the base of the standard 9. In order to clear the latch 41, link 97 is recessed at 101, thereby forming a shoulder 102 which serves a purpose hereinafter described. Between the magnet 87 and latch 41 is secured a stud 103 having a flattened head 104, adapted to enter a slot 105 in a lever 106 pivoted to said flattened head 104. Latch 41 is held against a shoulder 107 at the end of one arm 108 of lever 106 by a spring 109. At the end of the other arm 110 of lever 106 is secured the armature 111 of magnet 87. When said magnet is energized lever-arm 110 will be drawn down, thereby throwing the arm 108 up and releasing the latch 41. Secured to the top of stud 103 is a spring 112 which serves to force lever-arm 108 downward when magnet 87 is deënergized.

Mounted on a cross-bar 113 of the machine-frame is a spring-detent 114, which prevents cylinder 10 from being rotated on the return stroke of the pawl-carrying ring 24. Said detent also serves to locate cylinder 10 so that chambers 12 will exactly coincide with opening 68. Adjustably secured to shaft 7 adjacent the hub of cylinder 10 is a cam 115 which serves a purpose hereinafter described.

In order to prevent adherence of material to the faces of pistons 13 provision is made for bringing them into contact with a quantity of dry-flour or other suitable material carried in a receptacle 117 secured upon a bracket 118 adjacent the cylinder 10. A screw 119 formed integral with a shaft 120 mounted in said receptacle is rotated by a pulley 121 driven by a belt 122 running over a similar pulley 123 keyed to shaft 53, and said screw serves to keep the flour in the receptacle well toward the forward end thereof opposite an opening communicating with pistons 13. The flour is kept in a loose condition by pins or stirrers 125 projecting from shaft 120.

A scraper 126 secured to bearing 6 and cross-bar 113 cleans the surface of the cylinder 10 having the chambers 12 and also causes a charge adhering to the wall of any cylinder to be thrown upon a conveyer-belt 127 carried by drums 128 and 129 mounted respectively on shaft 32 and a parallel shaft 130 journaled in brackets 131 secured to the outside of machine-bed 1.

In the operation of the machine, a quantity of plastic material is placed in the hopper 5 and power is applied to the pulley 44 to set the rolls 62, 63 and 64 in motion through gearing heretofore described. Rotation of said rolls causes the plastic-material to be fed through opening 68 into the one of the chambers in line with opening 68, thereby forcing back the piston 13 in said chamber until the head 18 of its rod 14 engages the head 76 of screw 75, said screw having been previously adjusted to allow the desired quantity of material to be received in the chamber 12. As soon as said chamber becomes filled the continued pressure therein causes the screw 75 to be forced backward together with collar 78 until contact is made between screws 82 and 83. As before stated this completes an electric-circuit and energizes magnet 87, so that lever 106 will be operated to release latch 41, thereby permitting pawl 38 to engage ratchet-wheel 36 which is rotating with shaft 32.

It is obvious that when pawl 38 engages ratchet 36 cam 31, and arm 30 will rotate in unison therewith. The first half of a revolution of the arm 30 will through connection 28, ring 24, and pawl-and-ratchet-mechanism 27 turn the head 16 together with cylinder 10, one-third of a revolution, thereby bringing the next chamber 12 into register with the opening 68 of chute 4, and causing the filled chamber to be moved opposite the free end of arm 98. During the second half of a revolution of arm 30, ring 24, through connection 28, will be returned a little more than 1/3 of a revolution, so as to bring the pawl 27 slightly back of the next of a series of pawl-engaging notches, corresponding in number to the chambers 12. When the filled chamber 12 is moved opposite the free end of arm 98, said arm is thrown forward together with link 97 and lever 93 by cam 31, and in its forward movement arm 98 engages the end of the piston-rod in the filled chamber and forces the piston forward until it is flush with the outer surface of cylinder 10, thereby ejecting the measured charge of material.

During the rotation of the head 16 and the carrier 10, the heads 18 of the piston-rods engage the cam 115, and are by said cam forced forward until the pistons are exactly flush with the outer surfaces of said carrier or cylinder 10, said cam acting, therefore, as a safety device to cause this result to be achieved, should the lever 98 fail in any way to perform its work.

During the forward movement of link 97 the shoulder 102 engages latch 41, and returns it against the stress of spring 109 to its normal position, where it is held by lever-arm 108. As cam 31 completes its rotation arm 43 of pawl 38 engages the end of latch 41, thereby causing the pawl-arm 37 to be thrown away from the ratchet-wheel 36, and thus to arrest the rotation of arm 30 and cam 31 until the next chamber is filled and the latch 41 is again tripped.

Figure 1:
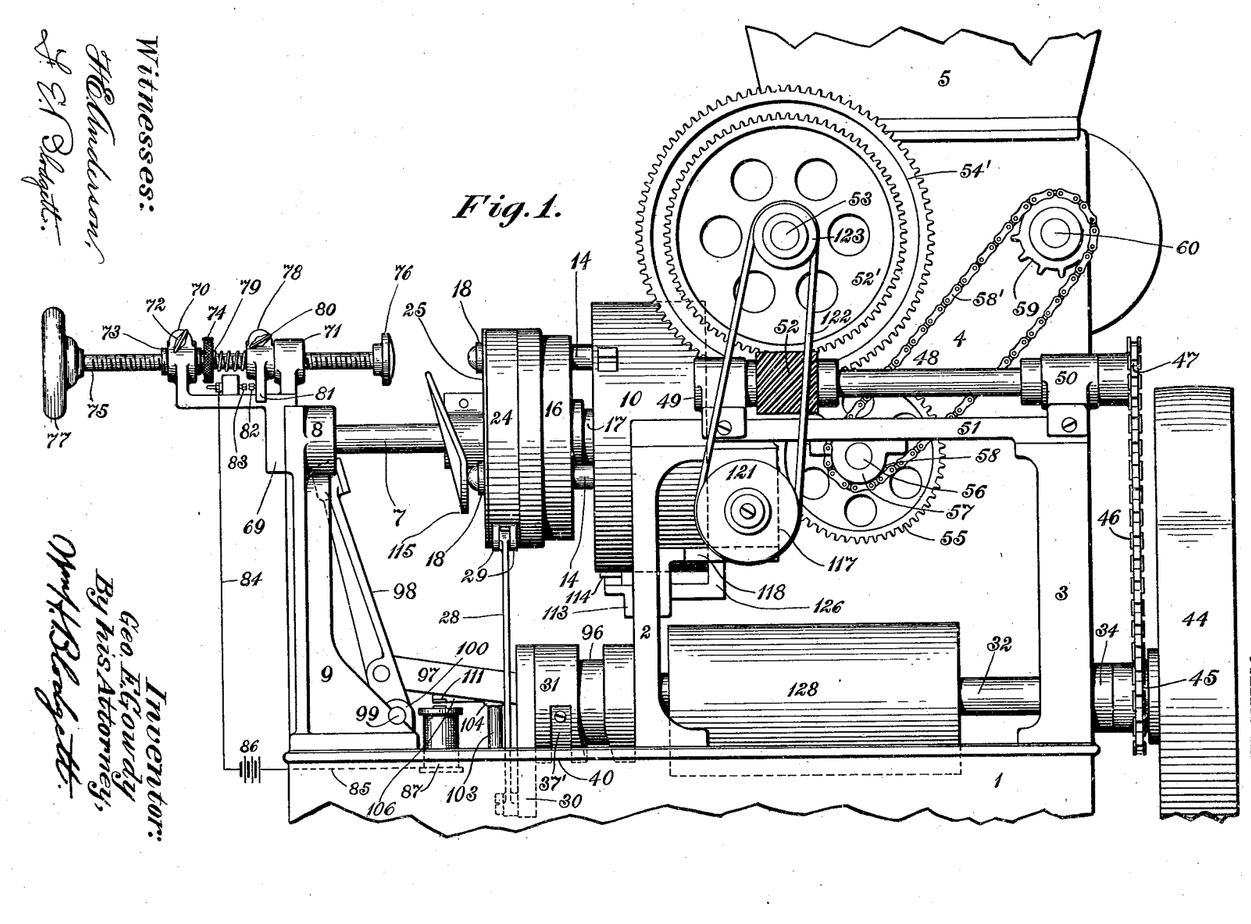
Figure 1 is a side elevation of my improved machine for dividing plastic-material.
Figure 2:
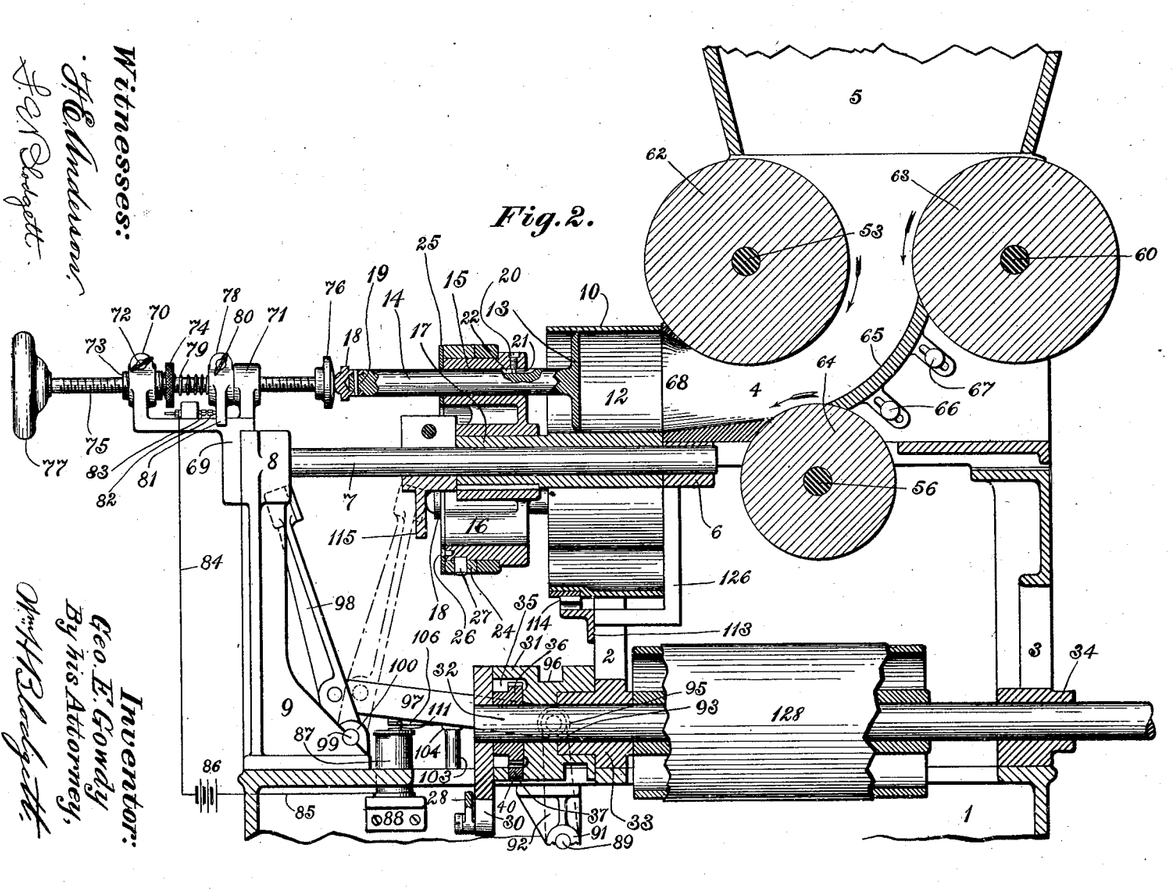
Fig. 2 is a longitudinal sectional view, partially in elevation.
Figure 3:
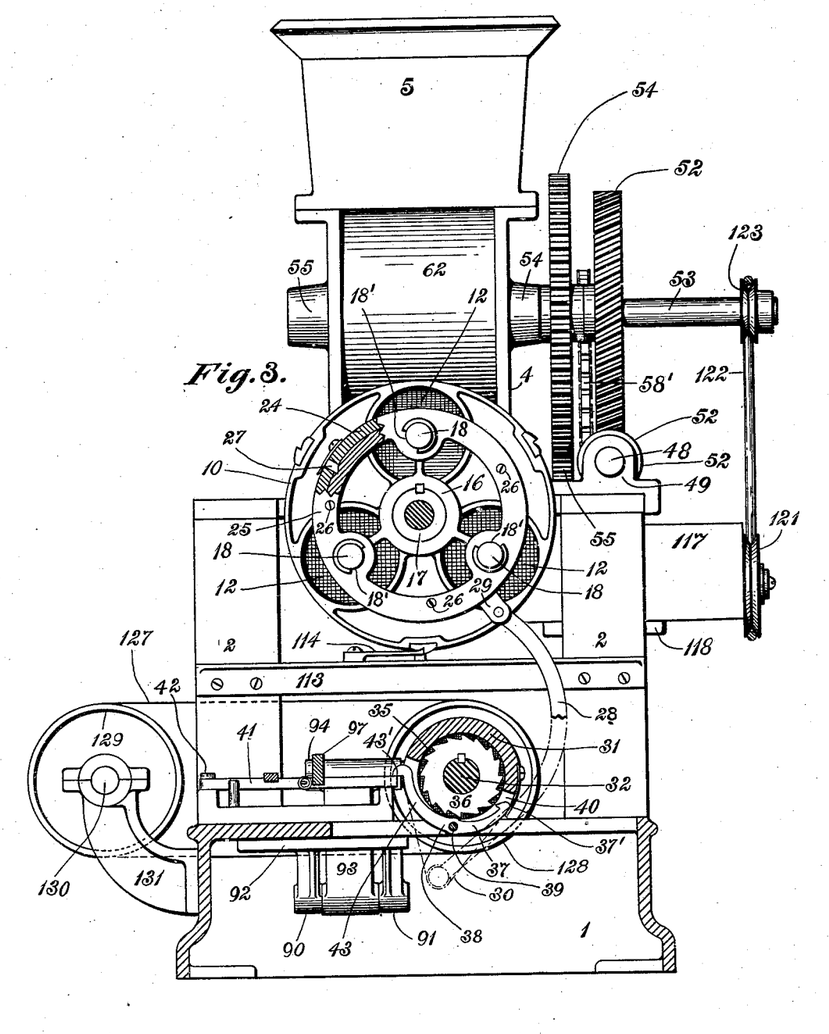
Fig. 3 is an end elevation partially in section.
Figure 4:
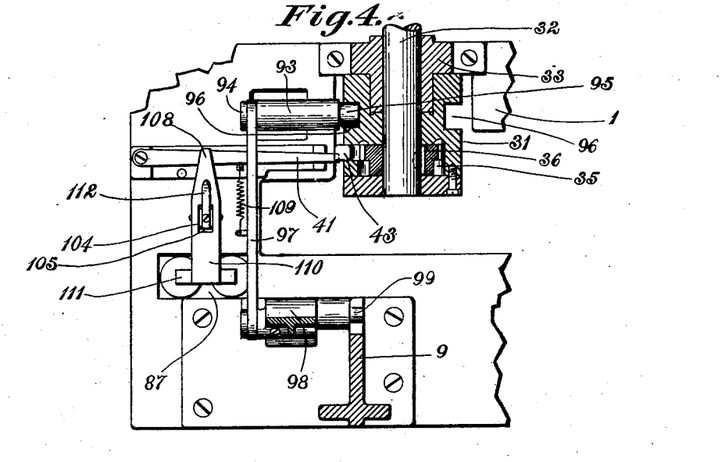
Fig. 4 is a plan view partially in section of the cam and plunger-actuating mechanism.
Figure 5:
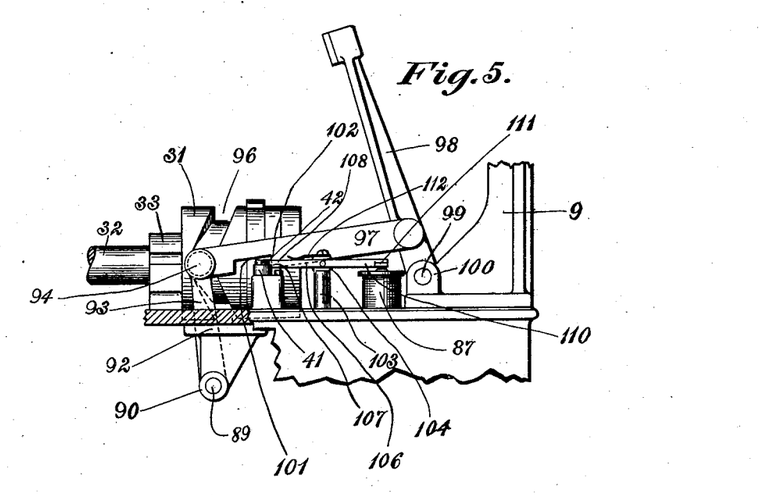
Fig. 5 is a side elevation of mechanism shown in Fig. 4.
Figure 6:
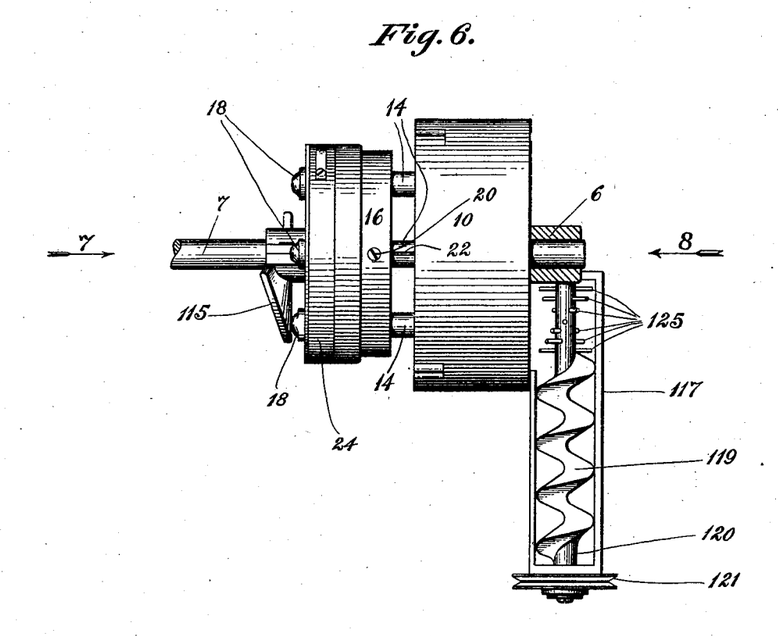
Fig. 6 is a detail view in plan and section of the cylinder and plunger-mechanism.
Figures 7, 8:
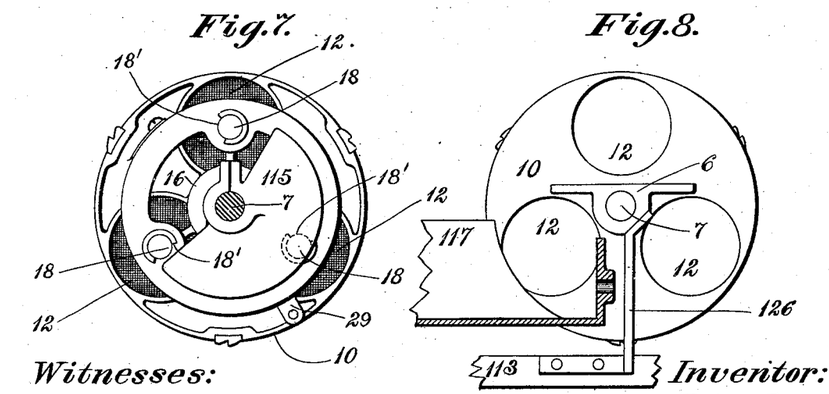
Fig. 7 is a view of parts shown in Fig. 6, looking in the direction of arrow 7.
Fig. 8 is a view of parts shown in Fig. 6, looking in the direction of arrow 8.

In the forward movements of the pistons 13 and their rods 14, the flanged heads 18 at the ends of the piston rods might interfere with the cam 115, and to prevent this interference said rods are cut away for a portion of their circumference, as illustrated in Fig. 7, thereby affording free clearance of the piston-rods on said forward movement.

While peculiar devices are illustrated for operating the various elements of the machine the invention is not limited to the precise construction illustrated and described, and includes within its purview various changes and modifications in constructive details. So too, the machine may be worked advantageously with material other than that of the plastic variety if occasion for such use should arise.

Having thus described the invention, what I claim is—

1. In a machine, of the class described, the combination, with a hopper and with a chute leading from said hopper, said hopper having a series of openings, of feed-rolls entering said openings; a carrier having a series of chambers; pistons in the chambers of said carrier; a head connected to the carrier and also to the pistons; a ring surrounding the head; pawl-and-ratchet-devices for connecting the ring and head; an adjustable stop for limiting the rearward movement of the pistons; means for imparting a forward movement to the pistons to expel the charges of material from the chambers; and a cam coöperating with said means, and serving to advance the pistons until their outer surfaces are flush with the outer surface of said carrier.

2. The combination, with a stationary shaft, of a carrier having a hub loosely mounted on said shaft, said carrier having a series of chambers for the reception of material; a head rigid with the hub of the carrier, and having a series of perforations in line with the chambers of said carrier; pistons in the chambers; piston-rods passing through the perforations of the head; a ring surrounding the carrier; pawl-and-ratchet devices connecting the head and ring; means for actuating said ring; a device for engaging the ends of the piston-rods to thereby force them forward within the chambers; and a cam to which the ends of said rods may be engaged to advance the pistons to a position flush with the outer surface of the carrier.

3. The combination, with a rotary carrier, and with a head connected thereto, said carrier having chambers for the reception of material, of pistons within the chambers of the carrier; piston-rods passing through perforations in the head; a ring loosely surrounding the head; pawl-and-ratchet-devices for connecting the ring and head; means for intermittently rotating the ring; an adjustable stop with which the ends of the piston-rods engage; electric-connections controlled by said adjustable stop; and means controlled by said electric-connections for actuating the piston-rods to cause them to expel the charges of material from the chambers of the carrier.

4. The combination, with a rotary carrier, and with a head connected thereto, said carrier having chambers for the reception of material, of pistons within the chambers of the carrier; piston-rods passing through perforations in the head; a ring loosely surrounding the head; pawl-and ratchet devices for connecting the ring and head; means for intermittingly rotating the ring; an adjustable stop with which the ends of the piston-rods engage; electric-connections controlled by said adjustable stop; and means controlled by said electric-connections for actuating the piston-rods to cause them to expel the charges of material from the chambers; and a device independent of said means for forcing the pistons to a position flush with the outer surface of the carrier.

5. The combination, with a rotary carrier, and with a head connected thereto, said carrier having chambers for the reception of material, of pistons within the chambers of the carrier; piston-rods passing through perforations in the head; a ring loosely surrounding the head; pawl-and ratchet-devices for connecting the ring and head; means for intermittingly rotating the ring; an adjustable stop with which the ends of the piston-rods engage; electric-connections controlled by said adjustable stop; means controlled by said electric connections for actuating the piston-rods to cause them to expel the charges of material from the chambers of the carrier; a device independent of said means for forcing the pistons to a position flush with the outer surface of the carrier; and means for applying a lubricant to said pistons when in flush position.

6. The combination, with a rotary shaft, and with a chambered cam loose thereon, of a ratchet-wheel rigid with the shaft, and located within the chamber of the cam; a pawl for engaging said ratchet-wheel; a device for holding said pawl out of engagement with the ratchet-wheel; a carrier having a series of chambers; and devices controlled by the cam on the driving-shaft for intermittently rotating said carrier.

7. The combination, with a rotary shaft, and with a chambered cam loose thereon, of a ratchet-wheel rigid with the shaft, and located within the chamber of the cam; a pawl for engaging said ratchet-wheel; a device for holding said pawl out of engagement with the ratchet-wheel; a carrier having a series of chambers; devices controlled by the cam on the driving-shaft for intermittingly rotating said carrier; and feed-mechanism for forcing material into the chambers of the carrier.

8. The combination, with a rotary shaft, and with a chambered cam loose thereon, of a ratchet-wheel rigid with the shaft, and located within the chamber of the cam; a pawl for engaging said ratchet-wheel; a device for holding said pawl out of engagement with the ratchet-wheel; a carrier having a series of chambers; devices controlled by the cam on the driving-shaft for intermittingly rotating said carrier; feed-mechanism for forcing material into the chambers of the carrier; pistons within the chambers of the carrier; means for limiting the rearward movement of said pistons; and means for advancing said pistons to expel charges of material from said chambers.

9. The combination, with a rotary shaft, and with a chambered cam loose thereon, of a ratchet-wheel rigid with the shaft, and located within the chamber of the cam; a pawl for engaging said ratchet-wheel; a device for holding said pawl out of engagement with the ratchet-wheel; a carrier having a series of chambers; devices controlled by the cam on the driving-shaft for intermittingly rotating said carrier; feed-mechanism for forcing material into the chambers of the carrier; pistons within the chambers of the carrier; means for limiting the rearward movement of said pistons; means for advancing said pistons to expel charges of material from said chambers; and a cam coöperating with said means, and serving positively to insure a flush position of the outer surface of each piston with the outer surface of the carrier.

10. The combination, with a rotary shaft, and with a chambered cam loose thereon, of a ratchet-wheel rigid with the shaft, and located within the chamber of the cam; a pawl for engaging said ratchet-wheel; a device for holding said pawl out of engagement with the ratchet-wheel; a carrier having a series of chambers; devices controlled by the cam on the driving-shaft for intermittingly-rotating said carrier; feed-mechanism for forcing material into the chambers of the carrier; pistons within the chambers of the carrier; means for limiting the rearward movement of said pistons; means for advancing said pistons to expel charges of material from said chambers; and means for applying a lubricating material to said pistons when in flush positions.

11. The combination, with a carrier having chambers, and with means for feeding material to said chambers, of a head rigidly connected to the carrier; a stationary shaft for supporting the carrier and head; an adjustable screw for limiting the return movement of the pistons; a stop on said screw carrying a contact-point; a second contact-point; an electro-magnet; a circuit between said electro-magnet and said second contact-point; and means controlled by the electro-magnet for advancing the pistons to cause them to expel charges of material from the chambers of the carrier.

12. The combination, with a carrier, having chambers, and with means for feeding material to said chambers, of a head rigidly connected to the carrier; a stationary shaft for supporting the carrier and head; an adjustable screw for limiting the return movement of the pistons; a stop on said screw carrying a contact-point; a second contact-point; an electro-magnet; a circuit between said electro-magnet and said second contact point; means controlled by the electro-magnet for advancing the pistons, and causing them to expel charges of material from the chambers of the carrier; and means for forcing the pistons to a position where their surfaces will be flush with the outer surface of said carrier.

13. The combination, with a carrier having chambers, and with means for feeding material to said chambers, of a head rigidly connected to the carrier; a stationary shaft for supporting the carrier and head; an adjustable screw for limiting the return movement of the pistons; a stop on said screw carrying a contact-point; a second contact-point; an electro-magnet; a circuit between said electro-magnet and said second contact-point; means controlled by the electro-magnet for advancing the pistons, and causing them to expel charges of material from the chambers of the carrier; means for forcing the pistons to a position where their surfaces will be flush with the outer surface of said carrier; and means for applying a lubricant to the outer surfaces of said pistons.

14. The combination, with a chambered carrier, and with means for intermittingly rotating the same, of a perforated head rigid with said carrier; pistons in the chambers of the carrier each having a rod; a head having a cut-away portion carried by each piston-rod; means for supplying material to the chambers of the carrier; means for advancing the pistons to expel the charges from said chambers; and a cam for acting on the heads of the piston-rods and serving to force said rods forward until the outer surfaces of the pistons are flush with the outer surface of the carrier.

15. The combination, with a chambered carrier, and with means for intermittingly rotating the same, of a perforated head rigid with said carrier; pistons in the chambers of the carrier each having a rod; a head having a cut away portion carried by each piston-rod; means for supplying material to the chambers of the carrier; means for advancing the pistons to expel the charges from said chambers; a cam for acting on the heads of the piston-rods and serving to force said rods forward until the outer surfaces of the pistons are flush with the outer surface of the carrier; and a scraper for removing adhering material from the pistons.

16. The combination, with a chambered carrier, and with means for intermittingly rotating the same, of a perforated head rigid with said carrier; pistons in the chambers of the carrier each having a rod; a head having a cut away portion carried by each piston-rod; means for supplying material to the chambers of the carrier; means for advancing the pistons to expel the charges from said chambers; a cam for acting on the heads of the piston-rods and serving to force said rods forward until the outer surfaces of the pistons are flush with the outer surface of the carrier; a scraper for removing adhering material from the pistons; and means for applying flour to the pistons.

17. The combination, with a rotary shaft, of a cam loose on said shaft; means for clutching said cam to the shaft; a carrier having a chamber for the reception of material; a perforated head rigid with the carrier; a piston and its rod; and means controlled by the cam for actuating the piston to expel a charge of material from the chamber.

18. The combination, with a rotary shaft, of a cam loose on said shaft; electrically-controlled devices for clutching the cam to its shaft; a carrier having a chamber for the reception of material; a perforated head rigid with the carrier; a piston and its rod; and means controlled by the cam for actuating the piston to expel a charge of material from the chamber.

19. The combination, with a stationary shaft, and with a chambered carrier loose thereon, of a perforated head rigid with the carrier; means for intermittingly-rotating the head and carrier; pistons in the chamber of the carrier; piston-rods; a movable stop with which each piston-rod engages when actuated by the entering charge of material in its chamber; and electrically-controlled devices for rotating the head and carrier, said devices being set into action by said movable stop.

20. The combination, with a stationary shaft, and with a chambered carrier loose thereon, of a perforated head rigid with the carrier; means for intermittingly-rotating the head and carrier; pistons in the chambers of the carrier; piston-rods; a movable stop with which each piston rod engages when actuated by the entering charge of material in its chamber; electrically-controlled devices for rotating the head and carrier, said devices being set into action by said movable stop; and means constituting an element of said electrically-controlled devices, for driving each piston forward to expel the charges.

21. The combination, with a stationary shaft, and with a chambered carrier loose thereon, of a perforated head rigid with the carrier; means for intermittingly-rotating the head and carrier; pistons in the chambers of the carrier; piston-rods; a movable stop with which each piston-rod engages when actuated by the entering charge of material in its chamber; electrically-controlled devices for rotating the head and carrier, said devices being set into action by said movable stop; means constituting an element of said electrically-controlled devices, for driving each piston forward to expel the charges; and means for causing each piston to assume a position flush with the outer surface of the carrier.

22. The combination, with a stationary shaft, and with a chambered carrier loose thereon, of a perforated head rigid with the carrier; means for intermittingly-rotating the head and carrier; pistons in the chambers of the carrier; piston-rods; a movable stop with which each piston rod engages when actuated by the entering charge of material in its chamber; electrically-controlled devices for rotating the head and carrier, said devices being set into action by said movable stop; means constituting an element of said electrically-controlled devices for driving each piston forward to expel the charges; means for causing each piston to assume a position flush with the outer surface of the carrier; and a scraper for cleaning the surface of the piston.

23. The combination, with a stationary shaft, and with a chambered carrier loose thereon, of a perforated head rigid with the carrier; means for intermittingly-rotating the head and carrier; pistons in the chambers of the carrier; piston-rods; a movable stop with which each piston-rod engages when actuated by the entering charge of material in its chamber; electrically-controlled devices for rotating the head and carrier, said devices being set into action by said movable stop; means constituting an element of said electrically-controlled devices, for driving each piston forward to expel the charges; means for causing each piston to assume a position flush with the outer surface of the carrier; a scraper for cleaning the surface of the piston; and means for applying lubricant to the face of each piston.

24. The combination, with a chambered carrier, and with means for actuating the same, of pistons slidable in the chambers of said carrier; a movable screw with which each piston-rod engages; a collar on the screw; a contact-point carried by said collar; a second contact-point; a circuit; an electro-magnet; and devices controlled by said magnet for setting into action the means for actuating the carrier.

25. The combination, with a chambered carrier, and with means for actuating the same, of pistons slidable in the chambers of said carrier; a movable screw with which each piston-rod engages; a collar on the screw; a contact-point carried by said collar; a second contact-point; a circuit; an electro-magnet; devices controlled by said magnet for setting into action the means for actuating the carrier; and means for causing each piston to assume a position flush with the outer surface of the carrier.

26. The combination, with a chambered carrier, and with means for actuating the same, of pistons slidable in the chambers of said carrier; a movable screw with which each piston-rod engages; a collar on the screw; a contact-point carried by said collar; a second contact-point; a circuit; an electro-magnet; devices controlled by said magnet for setting into action the means for actuating the carrier; means for causing each piston to assume a position flush with the outer surface of the carrier; and a device for clearing the face of the piston.

27. The combination, with a chambered carrier, and with means for actuating the same, of pistons slidable in the chambers of said carrier; a movable screw with which each piston-rod engages; a collar on the screw; a contact-point; a second contact-point; a circuit; an electro-magnet; devices controlled by said magnet for setting into action the means for actuating the carrier; means for causing each piston to assume a position flush with the outer surface of the carrier; a device for cleaning the face of the piston; and means for applying pulverulent material to the face of the piston.

28. The combination, with a shaft, of a cam loose thereon; means for clutching said cam to the shaft, and for releasing it therefrom; a lever actuated by the cam; a link; a second lever operated by the link; a carrier having chambers; pistons in said chambers; piston-rods; and means for filling the chambers, the material being discharged from said chambers by the impact of the second lever against the ends of the piston-rods.

In testimony whereof I affix my signature in presence of two witnesses.

GEORGE E. GOWDY.

Witnesses:
 Jno. J. Hoppin,
 Wm. D. Gibby.